United States Patent
Bickel et al.

[15] 3,680,115
[45] July 25, 1972

[54] VERY LOW FREQUENCY LOCATION FINDING SYSTEM

[72] Inventors: John E. Bickel; Clemens H. Freres, both of San Diego; Earl E. Gossard, Delmar; James E. Britt, San Diego; Norman R. Ortwein, San Diego; Eric R. Swanson, San Diego, all of Calif.

[73] Assignee: The United States of America as represented by the Secretary of the Navy

[22] Filed: April 29, 1969

[21] Appl. No.: 823,239

[52] U.S. Cl. .................343/105 R, 343/112 R, 343/112 TC
[51] Int. Cl. ...........................................G01s 1/30
[58] Field of Search..........................343/112, 105

[56] References Cited

UNITED STATES PATENTS

| | | | |
|---|---|---|---|
| 3,160,846 | 12/1964 | Gustafson et al. | 343/112 X |
| 3,430,234 | 2/1969 | Wright | 343/105 X |
| 3,471,856 | 10/1969 | Laughlin, Jr. et al. | 343/105 X |

Primary Examiner—Rodney D. Bennett, Jr.
Assistant Examiner—Richard E. Berger
Attorney—G. J. Rubens, R. S. Sciascia, J. W. McLaren and T. M. Phillips

[57] ABSTRACT

To display at a command post the positions of all vehicles in a tactical area, each vehicle receives two very low frequencies (VLF's) of an "Omega" system, and retransmits the phase information thereof by a high frequency link to the command post where a general purpose computer determines the direction and the distance to each remote vehicle.

4 Claims, 4 Drawing Figures

INVENTORS
JOHN E. BICKEL
CLEMENS H. FRERES
EARL E. GOSSARD
JAMES E. BRITT
NORMAN R. ORTWEIN
ERIC R. SWANSON

BY

ATTORNEYS

VERY LOW FREQUENCY LOCATION FINDING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Generally, radio navigating systems are of little value in controlling the military traffic in a tactical area and do not respond well to the central command. Because of the speed of jet fighters they are over the radio horizon much of the time and out of contact with the central command station. Homing systems can guide fighters to their carriers, but little more. All navigating equipment which must be airborne is prohibitively expensive in terms of reduced payloads. This fact is particularly true of the long wave radio gear used in the "Omega" system where 10 to 14 kilohertz are used. At present there are several of a total of eight such transmitters operative about the earth. They lay down a grid of guidelines. Dipoles for such low frequencies are 7 miles long.

The object of this invention is to minimize the weight of radio gear to be carried in the airplanes in a battle area and at the same time provide the area commander with a display of the position of all friendly units in his command.

SUMMARY OF THE INVENTION

The objects of this invention are attained by a repeater for receiving the VLF position information signals, modulating the information on a high frequency carrier, and retransmitting the modulated carrier to the master or headquarters station where the phase information is detected and displayed. This provides the headquarters command with a picture of all units in the area and at the same time relieves the airborne unit of the bulkiness and weight of phase detectors and computing equipment for position determination.

PREFERRED EMBODIMENTS OF THE INVENTION

Figure 1:
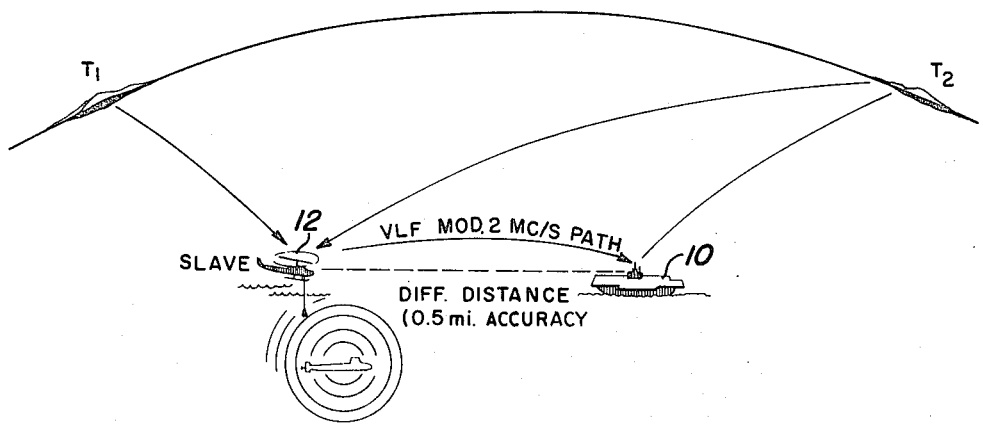
FIG. 1 is a perspective view of a segment of the earth's surface and the deployment of equipment of the system of this invention.

A substantial portion of the earth's surface is presently covered by a grid of imaginary lines laid down by OMEGA VLF transmitters located at various fixed points about the globe. Each transmitter is connected to a long antenna and broadcasts substantially omnidirectionally. The low frequencies follow the curvature of the earth and are not substantially attenuated beyond the horizon as in the case of higher frequencies. In FIG. 1 is shown two of the fixed low frequency transmitters labeled $T_1$ and $T_2$. The tactical situation assumed for describing this invention will be that where the airplane carrier 10 is at some great distance from the two transmitters and comprises the command post and homing station for a number of airplanes 12. According to this invention, a large portion of the electronic gear necessary in an operating squadron is transferred to the carrier 10.

Since the error in any radio navigating system is generally a fixed percent of the range, it is desirable to eliminate the error caused by great distances between the carrier 10 and the radio transmitters $T_1$ nd $T_2$. In tactical situations, it is more important to accurately know the range and direction of each of the airplanes 12 with respect to its landing strip on the carrier. While the triangular, geometric problems solved by the system of this invention include the great ranges mentioned, these ranges so appear in the computation that they generally cancel out. The output of a carrier based computer will include only error attributable to the short ranges between the carrier and its airplanes.

Figure 2:
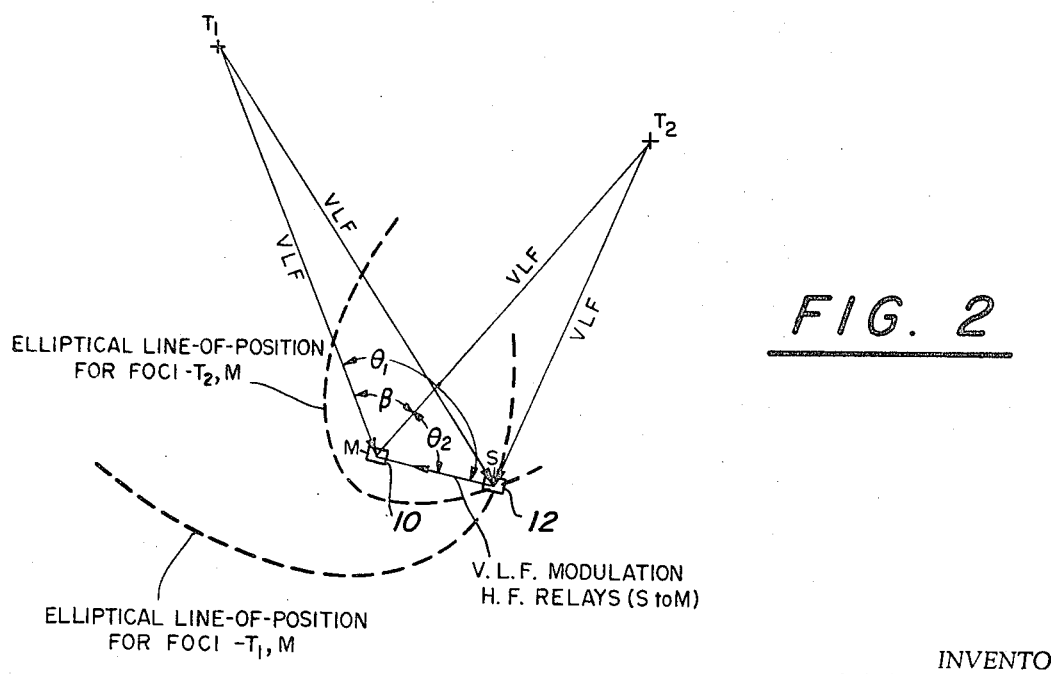
FIG. 2 is a diagram showing the geometric problem solved by the system of this invention.

According to an important feature of this invention, the geometry of the tactical problem of FIG. 1 can be laid out as illustrated in FIG. 2 where the two land-based OMEGA transmitters $T_1$ and $T_2$ and the master station, M, preferably aboard the carrier 10, and the slave station, S, preferably airborne, define two triangles. One side, S-M, of each of the triangles is common to the other. Only two OMEGA very low frequency (VLF) transmitters are required, as distinguished from the usual three transmitters required in "Omega" type navigation. Further, all computation and phase tracking is done at the headquarters unit M. The position of the slave S with respect to M is the only unknown. The lines-of-position of S with respect to M are elliptical, as distinguished from the more common hyperbolic systems as OMEGA or LORAN. The position of the slave is at the intersection of two ellipses as shown in FIG. 2. An ellipse is defined as the locus of a point for which the sum of its distances from two fixed points is constant. Thus, for S on any ellipse drawn about the foci $T_1$ and M the sum $(T_1S+SM)$ is constant, and for foci $T_2$ and M, the sum $(T_2S+SM)$ is constant. The invention described herein measures the difference $[(T_1S+SM)-T_1M]$ and $[(T_2S+SM)-T_2M]$. Since by independent means such as OMEGA, $T_1M$ and $T_2M$ are known, $(T_1S+SM)$ and $(T_2S+SM)$ may be determined. The angle $\beta$ shown in FIG. 2 is also known. Therefore, with the law of cosines the triangles $T_1MS$ and $T_2MS$ may be determined giving the values for MS, $\theta_1$ and $\theta_2$, noting from the figure that $\theta_1 = \beta+\theta_2$. The equations found by the law of cosines may be written.

$$SM = \frac{(T_1S + SM)^2 - T_1M^2}{Z[(T_1S + SM) - T_1M \cos \theta_1]} = \frac{(T_2S + SM)^2 - T_2M^2}{Z[(T_2S + SG) - T_2M \cos \theta_2]}$$

A telemetry path is established between the slave S and the master M which path might be a high frequency ground wave of a frequency of perhaps 2 or more megacycles per second modulated in amplitude, frequency or in phase by the very low frequency (VLF) signals received at the slave station from the transmitters $T_1$ and $T_2$. For the narrow bandwidth permitted by the system, practical ranges out to 300 miles is realized. The higher the telemetry frequency, the lighter and smaller can be the equipment necessary to repeat and pass on the phase information received at the airplane slave station S.

Figure 3:
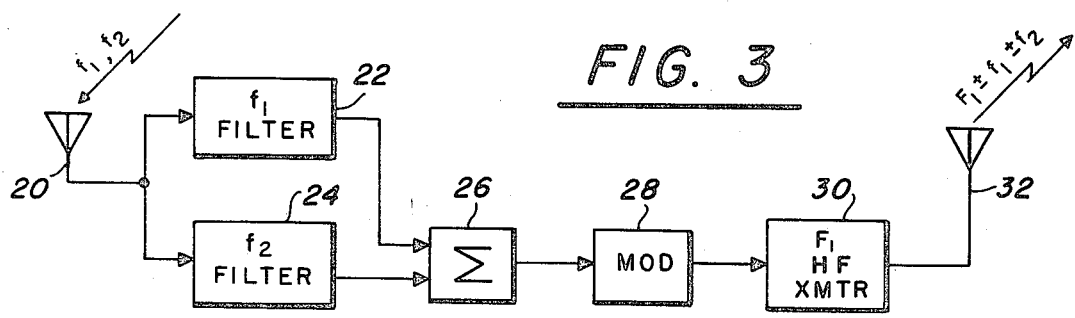
FIG. 3 is a block diagram of the airborne equipment of this invention.
Figure 4:
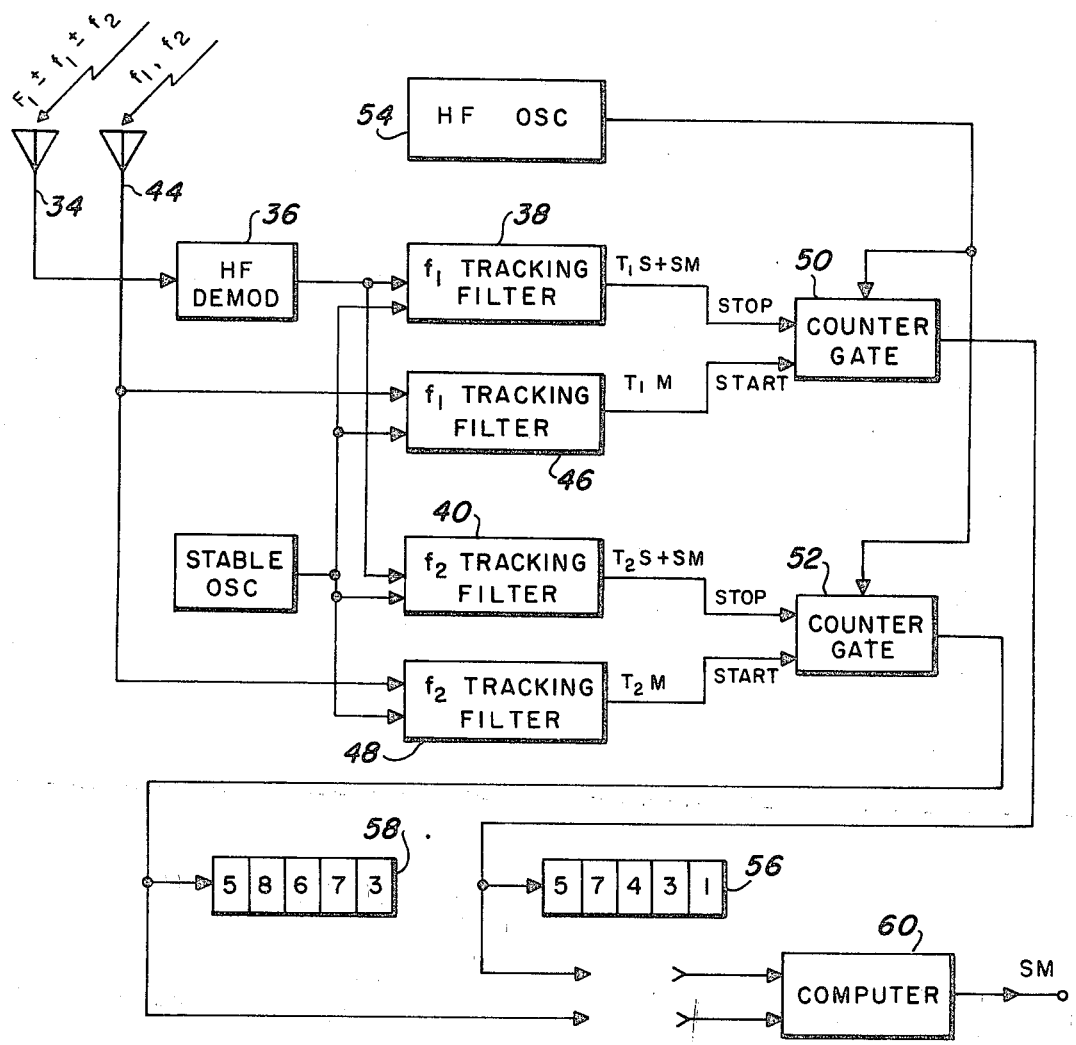
FIG. 4 is a block diagram of the master station equipment of this invention.

More specifically, the block diagrams of FIGS. 3 and 4 illustrate one embodiment of this system. On the airplane is carried the repeater including the antenna 20 coupled to filters 22 and 24 for selecting the signals $f_1$ and $f_2$ from the fixed, remote transmitters $T_1$ and $T_2$. These signals are suitably amplified, limited, applied to the linear summing device 26, and modulated at 28 on the high frequency carrier, F, generated in transmitter 30. The omnidirectional antenna, such as a whip 32, now radiates the $F \pm f_1$ and $F \pm f_2$. This radiated signal is received at the master station on antenna 34 and is demodulated in the receiving circuits 36 to recover the $f_1$ and $f_2$ signals which are in turn separated by the tracking filters 38 and 40.

Additionally, the same signals $f_1$ and $f_2$ radiated by the fixed transmitters $T_1$ and $T_2$ are received directly on antenna 44 and are separated in tracking filters of 46 and 48. Now the magnitude of the difference between the direct path, TM, and the indirect path TS + SM, appears at the outputs of the tracking filters and conveniently these magnitudes can be measured by the gates 50 and 52 which will permit the output of any stable high frequency clock source 54 to flow into the counting registers 56 and 58 to display the numerical magnitude of the difference in the sides of the triangles of FIG. 2.

Since the length of the line $T_1M$, FIG. 2, is always equal to or less than the sum $(T_1S+SM)$ of the lines $T_1S$ and SM, the signal $f_1$ received over the direct path will always arrive at the master station ahead of the signal arriving over the indirect path; hence the $T_1M$ signal is applied to the start circuit of the counter gate 50. Likewise, the directly received signal $f_2$ is applied to the start circuit of counter 52. Each start circuit opens the gate and permits the flow of high frequency pulses from the source 54 into the registers 56 and 58. Then the later indirectly received signals are applied to the stop circuits of the counters and the differences now of the direct and indirect paths and shown on the counters. These two magnitudes can preferably be applied to the computer 60 which will isolate the desired unknown SM.

Many specific computer programs may be adopted for solving the geometric problem of FIG. 2 where it is desired to know the direction as well as the range from M to each of a large number of airplanes S. This requires instant computation and display.

For any value of time difference in the direct and indirect paths from $T_1$ to M, there is a large number of values of TS and MS. The time difference, or distance difference, measured by the counter gate 50 and its display 56 expresses not a position but a "line of position". To obtain a fix along any line, a second line of position intersecting the first line must be established. Establishing the fix position of point S can be accomplished in different ways. Sets of graphs of elliptic curves having series of progressive ratios of major-minor axes corresponding to the time-difference numbers displayed at 56 and 58 may be used.

Alternatively, the two lines of position can be computed directly in the computer 60 of any general purpose capability, merely by feeding the distance information $T_2S + SM$, $T_1S + SM$, $T_2M$, $T_1M$, properly digitalized into the computer.

Obviously many modifications and variations of the present invention are possible in the light of the above teachings. It is therefore to be understood that within the scope of the appended claims the invention may be practiced otherwise than as specifically described.

What is claimed is:

1. A system for locating point S with respect to point M comprising:

two remote broadcasting transmitters $T_1$ and $T_2$ radiating frequencies $f_1$ and $f_2$, respectively, said transmitters being at known fixed spaced locations for laying down in the area of points S and M a grid of intersecting lines of position, a radio repeater at said point S for receiving said frequencies $f_1$ and $f_2$, and rebroadcasting said frequencies on a carrier wave of unique frequency, $F_1$, means at said point M for receiving all frequencies $f_1, f_2,$ and $F_1$, and means at said point M for measuring the time phase of signals $f_1$ and $f_2$ received directly from said two remote transmitters $T_1$ and $T_2$, means at said point M for measuring the time phase of signal $f_1$ and $f_2$ received indirectly from said two remote transmitters $T_1$ and $T_2$ through said repeater, and means at said point M for computing from said time phases the distances from M to $T_1$, to $T_2$, and to S.

2. A system for controlling a squadron of airplanes from a relatively stationary command post, said system comprising;

two fixed omnidirectional broadcasting stations, $T_1$ and $T_2$, radiating frequencies $f_1$ and $f_2$, respectively, said broadcasting station being at known fixed spaced locations for laying down in the area of the airplanes and the command post a grid of intersecting lines of position, a slave radio relay station, S, carried on each of said airplanes, each slave station including a HF transmitter and a radio receiver coupled directly to and modulating said HF transmitter for receiving said frequencies $f_1$ and $f_2$, and rebroadcasting said frequencies on a carrier wave of unique frequency, $F_1$, a command post comprising a master radio receiver, M for receiving all frequencies $f_1, f_2,$ and $F_1$, a computer coupled to the output of said master receiver, said computer including means for measuring from said master station, M, the time phase of signals $f_1$ and $f_2$ received directly from said broadcasting stations, the time phase of signals $f_1$ and $f_2$ received indirectly from said relay stations and for computing from said time phases the distances from said command post M, to the slave stations, S.

3. In the system defined in claim 2, the radio repeater of said slave station S comprising;

a receiving antenna and selective filters for isolating said frequencies $f_1$ and $f_2$, said HF transmitter generating the frequency F which is relatively high compared with said $f_1$ or $f_2$, and a modulator coupled between said filters and said transmitter for modulating said frequency F with $f_1$ and $f_2$.

4. In the system defined in claim 2, said master station receiver comprising;

an antenna system and demodulator for deriving frequencies $f_1$ and $f_2$ received on said carrier F, filter means coupled to said demodulator for separating $f_1$ from $f_2$, antenna means and filter for receiving and separating $f_1$ and $f_2$ received directly from said transmitters $T_1$ and $T_2$.

* * * * *